United States Patent Office 3,196,018
Patented July 20, 1965

3,196,018
COATED MENADIONE BISULFITE ADDUCT
William Galler, 986 Wateredge Place,
Hewlett Harbor, N.Y.
No Drawing. Filed Aug. 8, 1960, Ser. No. 47,914
7 Claims. (Cl. 99—2)

This invention relates to a particular vitamin K active material, namely a water soluble menadione bisulfite adduct in finely divided particle form bearing a protective coating. It also relates to an animal feed premix, particularly a poultry feed premix, containing coated particles of a water soluble menadione bisulfite adduct. In another aspect it relates to a mash or a pelletized animal feed, either in final form or in concentrated form, which contains a coated water soluble menadione bisulfite adduct. In yet another aspect the present invention relates to a pelletized animal feed containing a coated water soluble menadione bisulfite adduct.

Besides other benefits, since its use eliminates hemorrhagic disease in chickens and turkeys and minimizes blood clots in eggs, vitamin K fortification of poultry feed is now a generally accepted practice. There are many vitamin K active compounds, and the term encompasses a variety of different substances, some of which are oil soluble, for example the natural vitamin K, phytyl menadione, as well as menadione itself. The oil soluble materials possess the disadvantage that the bird cannot absorb the vitamin K active substance into its blood stream unless bile is present in the intestine. Frequently bile flow is impeded in diseased birds or birds under stress, and accordingly there is limited absorption of an oil soluble vitamin K form. Furthermore, menadione, for example, is a very irritating chemical requiring special handling by the feed formulator, often a local feed mill.

The present invention is concerned only with water soluble menadione material, particularly the bisulfite adduct of menadione, referred to herein for purposes of convenience as "MBA." The adduct may be an alkali metal, alkaline earth metal, ammonium or amine bisulfite salt. These materials are readily water soluble, and the one in most general use is menadione sodium bisulfite, referred to herein as "MSB." These compositions are completely free of the irritating properties which characterize menadione and, being water soluble, are readily absorbed into the blood stream of the animal regardless of the quantity of bile present in the intestine.

Many of the micro ingredients added to animal feed, and particularly certain of the oil soluble vitamins, are subject to deterioration and loss of potency by the action of one or more of other ingredients of the feed or by oxygen of the air. For example, certain vitamins are adversely affected by the presence of oxygen and/or certain minerals. Perhaps the most sensitive material is vitamin A which is easily oxidized. It is an oil soluble material, as is menadione, and means to protect the oil soluble materials, as by coating with materials which will exclude air and minerals and/or with the inclusion of anti-oxidants, are not effective in preventing deterioration of MBA, the vitamin K active material with which the present invention is concerned. Deterioration of MBA is not effected by atmospheric oxygen, and moisture and minerals appear to produce a deleterious effect upon the material at elevated pH. It is believed that the method of decomposition of MBA is through removal of the bisulfite portion of the salt and/or by hydrolysis under alkaline conditions. While moisture is not important in decomposition of the oil soluble micro ingredients, its presence along with alkaline reacting material permits rapid deterioration of water soluble MBA.

Decomposition of MBA is a particularly important and undesirable factor, as set forth in detail in my co-pending application Serial No. 845,624, filed October 12, 1959, of which this application is a continuation-in-part, in an MBA premix, which is a first dilution of the MBA to facilitate introduction by the feed formulator of the very small quantity of MBA required per ton feed. MBA in a premix loses its potency at a faster rate than the undiluted material because the diluent or carrier of the premix is very often alkaline reacting and capable of attracting and holding moisture. For example, a premix will often lose as much as 90% of its vitamin K activity, depending upon its age and storage conditions. When stored at elevated temperature and humidity decomposition is very rapid. In my earlier application, stabilizers are provided which when added to the premix retard very substantially the decomposition of MBA. The present invention provides a different approach to assuring stability, which may be used alone or in combination with stabilizing chemicals such as are set forth in my earlier application.

Feed supplied to farm animals, particularly poultry, in general is in one of three forms, either mash, pellets or crumbles. A mash simply comprises a dry mixture of the various gross feed ingredients together with the variety of micro ingredients, i.e. the vitamins and other dietary supplements now so largely employed. Pellets on the other hand consist of mash which is subjected to elevated temperature and pressure, often in the presence of steam, to produce shapes generally in the form of small cylinders. They vary in diameter and length and are most often produced by extrusion. Crumbles are a sub-class of pellets, and for the purposes of this application the term "pellets" is intended to include crumbles. They may simply be broken pellets or pellets of very small size. It has been established that pelleted feed will produce more gain in weight per pound of feed consumed by the animal than mash, and crumbles are advantageous in feeding younger animals. It has been reliably estimated that about 55% of all manufactured feed is produced in the form of pellets or crumbles, and in some areas as much as 80% of all feed is pelletized. During pelletizing high temperatures and high moisture contents are encountered. For example temperatures may reach 600° F. for a short time and a steamed mash prior to pelleting may be as hot as 250° F. As the pellets emerge from the die their temperature is about 400° F. It has been estimated that extrusion pressure may reach 65,000 p.s.i. for a short period.

Modern feeds contain small quantities of many constituents other than the gross ingredients, fats, carbohydrates and proteins, which are added to provide a completely nutritive diet and to also supply certain antibiotics. Some commercial feed formulas may contain from 20 to 30 different micro ingredients, and over 150 such materials have been approved for use. Obviously, at the aforementioned conditions of moisture, temperature and pressure, it is difficult to prevent chemical interaction and decomposition of certain of the micro ingredients as well as the gross ingredients.

It has been found that MBA in a typical commercial mash is reasonably stable throughout the useful life of the feed. However, when the same mash is pelletized the pellets exhibit a loss of vitamin K potency of at least about 45%. Following storage for periods of up to 30 days an additional loss of 10% potency is not uncommon. Since there is this very substantial loss due to decomposition of MBA in pelleted feeds, the feed manufacturer is never quite sure of the precise MBA assay of the feed he delivers to the user. Of course, he can introduce into the mash more MBA than is required in the pelleted feed to overcome this anticipated loss, but this technique has many disadvantages not the least of which is economic.

The present invention is concerned with the physical and chemical protection from destruction of finely divided particles of MBA, to a premix containing thusly protected particles of MBA, which premix retains its vitamin K potency with the passage of time after exposure at elevated temperature and humidity, and also to a finished feed, particularly a pelletized feed in which the potency of the MBA is at least about 75%, and preferably is above about 90%, of its potency in the same unpelleted feed.

In accordance with the present invention, I provide a coating or protective film for the finely divided MBA particles which is substantially impermeable to moisture, thus protecting the MBA from what I have determined to be the important factors in its decomposition. With a moisture barrier erected between the MBA and its surroundings, for example, the other ingredients of the feed which may supply the alkali and/or moisture necessary for decomposition, the moisture of the air or the moisture content of the other feed ingredients carrying small quantities of minerals and alkali cannot reach the MBA.

The coating or film material that surrounds the particles of the water soluble menadione bisulfite adduct is non-toxic and substantially impermeable to moisture, yet it is readily penetrated by digestive fluids present in the stomach of the animal. Several film materials have been found to produce excellent results, among which are methyl cellulose, ethyl cellulose, edible shellac, waxes, for example, glyceryl monostearate, other polyhydric fatty acid esters, hydrogenated tallow, cellulose acetate phthalate and polyvinyl fatty acid esters such as polyvinyl stearate. Two preferred materials are ethyl cellulose and shellac.

In one embodiment of the present invention particles of a digestible material are dispersed throughout the film material surrounding the particle of MBA and on the exterior surface of the film. This digestible material may be one of the many carrier materials employed in an MBA premix, examples of which include:

cornmeal
corncob meal
milo
soybean oil meal
alfalfa meal
dried whey
wheat shorts
distillers' dried solubles
salt
meat scraps
butyl fermentation solubles
feather meal
poultry by-products
wheat middlings
dextrose
lactose meal
dried kelp
linseed oil meal
oatmeal
dried yeast
wheat bran as set forth in my earlier application, Serial No. 845,624, now U.S. Patent No. 3,079,260. The digestible material dispersed throughout the coating film may be soybean meal which is rapidly digested, leaving pores in the film so that the digestive juices may reach the interior of the particle dissolving the MBA for absorption in the intestine. A preferred digestible material is calcite flour, which is a mineral supplement.

The product of the present invention may be prepared by mixing finely divided MBA with a dispersion or solution of the coating material, and then either spray drying or spray chilling the mixture, depending upon its character, so that as the vehicle is removed the coating material is deposited about the MBA particles, substantially completely covering them. Alternatively the product may be prepared by dispersing MBA in a molten or viscous mass of the coating material, subsequently cooling or otherwise solidifying and then grinding the resulting slab. In this instance virtually all of the MBA particles are also completely covered with coating material.

Regardless of the manner in which the coated product is prepared, it is to be understood that the finely divided MBA to be coated may be mixed with one or more of the acid reacting stabilizers as indicated and in proportions set forth in my above identified earlier application before application of the coating. The acid reacting stabilizer is a weakly acidic material, desirably a salt of a weak base and a strong acid or a weak organic acid or organic salt. In addition to its ability to inhibit decomposition of MBA in the premix, the stabilizer preferably serves another purpose in the ultimate feed. It is, for example, a mineral or nutritional factor supplement. A stabilizer must, of course, be chosen which will not be harmful to the poultry in the amounts employed. A wide variety of acidic inorganic and organic salts and organic acids also stabilize MSB premixes. A preferred stabilizer is monocalcium phosphate.

Exemplary of additional stabilizers are hemisodium phosphate, sodium acid pyrophosphate, ferric pyrophosphate, ferric orthophosphate, trialuminum phosphate, monomagnesium phosphate, calcium sulfate, calcium nitrate, potassium pyrosulfate, calcium glucuronate, 2-furoic acid, calcium lactate, calcium stearate, the ammonium, zinc, iron, aluminum, and manganese salts of hydrochloric, nitric, and sulfuric acids, dibasic ammonium phosphate, and acetylsalicylic acid, as well as many other similar compounds.

The preferred stabilizer, monocalcium phosphate, is a mineral supplement and upon inclusion of the thus protected MSB premix in the complete feed, the monocalcium phosphate serves this secondary purpose. I have found that certain nutritional factors and nutritional supplements which are employed in a complete poultry feed may also be employed to stabilize MBA in the premix. For example, both niacin and choline chloride exert a very substantial stabilizing influence upon MSB in calcite and soybean meal premixes. In the case of niacin, which is present in the complete feed in amounts between about 20 and 90 grams per ton, the entire quantity required may be introduced from a premix containing MSB, in which premix the niacin serves to substantially completely inhibit the deterioration of MSB.

A still further material which serves to effectively inhibit deterioration of MSB and also performs a useful function in the complete feed is terephthalic acid. It is not believed to be a nutritional supplement, but serves to potentiate or increase the broad spectrum antibiotic content of the blood. That is to say, it greatly improves the effectiveness of the broad spectrum antibiotics, for example, tetracycline and its derivatives. The soluble salts of terephthalic acid are at least as active as the free acid in potentiating oxytetracycline serum levels, and the soluble salts have also found to exert a substantial stabilizing influence upon MSB in the premix.

The quantity of stabilizer required to effectively inhibit decomposition of the MSB will depend upon the concentration of MSB in the premix. The more concentrated the premix, the less stabilizer required. As a general rule at least 4 grams stabilizer will be employed per pound of premix, although stabilizing activity has been observed with the more strongly acidic stabilizers when present in amounts less than 4 grams per lb. A range of about 12–36 grams will adequately protect the very dilute as well as the concentrated premixes.

The spray dried or spray chilled coated product may be sold as is, or it may be compounded into a premix by addition to a suitable carrier. The premix may then be incorporated into a final feed mash and the mash marketed as such or it may be pelleted. Vitamin K stability in the pelleted product is exceedingly good, as will be shown hereinafter.

The following non-limiting examples illustrate the manner in which the product of the present invention bearing a wide variety of coating materials may be produced. The table following Example IX reports the stability of pelletized feeds in accordance with the present invention as compared with the starting mash, and with pellets containing uncoated MBA.

Because of the almost impossibility of assaying for MBA in feeds containing the material at normal usage levels, in the following examples mixed feeds were commercially prepared using MBA at levels sufficiently high in the feed that assays could be easily performed. In each of the examples batches of feed of 1 ton each were prepared and a ten pound portion of the mash was retained for assay and storage stability tests. The balance of the ton of feed was then pelletized under normal commercial conditions, and a ten pound sample of the center portion of the pelletizing run was retained for assay and storage stability tests, thus assuring a uniform standard. The remainder of the feed was fed out to broiler chicks and layer hens without any adverse effects even at these higher than usual MBA levels, which demonstrates the lack of toxicity of the product. In all cases where possible sufficient MSB was added to yield a feed containing the equivalent of 63.0 g. menadione per ton, approximately 100 times the normal commercial feeding level.

Approximately seven days on the average elapse between pelleting at the feed mill and first use by the poultry farmer in feeding, and for this reason seven days has been used as the period in the vitamin K pellet storage stability tests. During this period the pellets were exposed to air at ambient humidity and temperature which were considered average conditions of storage and transportation.

*Example I*

For comparative purposes a feed mash was prepared containing MSB in amount equivalent to 63 g. menadione (M) per ton. Upon pelleting and after normal storage for a period of 7 days the pellets were found to contain 36.6 g. M/ton, which amounted to a 41.8% loss of vitamin K potency as a result of pelletizing and seven-day storage thereafter.

*Example II*

One part of "Methocel," 10 cps. (Dow Chemical Co. brand of methyl cellulose) and one-half part of Methocel 15 cps. were added to hot water with stirring to which there were then added ice and water in amount sufficient to produce a viscous solution containing about 8.9% methyl cellulose. One part of this solution was slurried with four parts of MSB with the intention of producing a product consisting of 75% vitamin K active material and 25% coating material. The resulting slurry was spray dried at a level of 15% total solids. Assay showed the dry product to contain 65% MSB. This material was then compounded into a feed mash and pelletized. Seven days after pelleting the loss in vitamin K potency was approximately 21%, which compares very favorably with the pellets of Example I which lost approximately 42% of their vitamin K potency.

*Example III*

500 g. of "Aldo 28" (Glyco Products brand of glyceryl monostearate) was melted and 350 g. of MSB added thereto and thoroughly mixed. The resulting material was spray chilled to produce dry coated MSB particles containing about 31% MSB by weight. This material was compounded into a feed and seven days after pelleting the vitamin K had dropped only 19.6%.

*Example IV*

1000 g. of "Aldo 28" and 200 g. stearic acid were dissolved in 3757 g. of ethanol and the solution made uniform by stirring and warming. Stearic acid was added to overcome any residual alkali in the glyceryl monostearate product, since it has been established that moisture and alkali accelerates deterioration of MSB. To one part of this solution there was then added four parts of MSB. The resulting slurry was then spray dried, and in this respect the manner of coating differed from that of Example III. The dry product was compounded into a feed which was then pelletized. After 7 days the pellets showed a loss of vitamin K activity of 24.5%.

*Example V*

343 g. of ethyl cellulose was dissolved in 1578 g. of ethanol to which solution there was then added 1029 g. of MSB and 500 g. of isopropyl alcohol to produce a slurry of MSB in the organic solution. The solution was spray dried and the dry coated product found to contain 82.5% MSB. The material was compounded into a feed which was then pelletized, and after 7 days showed a loss of vitamin K potency of only 7.7%.

*Example VI*

To 1000 g. of an ethanol solution of edible shellac, i.e. pharmaceutical glaze, containing four pounds of shellac per gallon, there was added 1110 g. of MSB and 1000 cc. of isopropyl alcohol. The alcohol was added to thin the solution sufficiently to enable spray drying. The dried product assayed 87.5% MSB and upon compounding into a feed and pelletizing the pellets showed a loss of vitamin K potency after 7 days of only 6.7%.

*Example VII*

To three parts of a 50:50 ethyl acetate:isopropyl alcohol solution of cellulose acetate phthalate of a solids content of 8.3% there was added one part by weight of MSB and the resulting mixture was spray dried. The dry coated MSB product assayed 97.5% MSB. Upon compounding, pelletizing and aging for 7 days analysis showed a loss of vitamin K potency in the pellets of 17.2%.

*Example VIII*

Four parts of MSB were added to one part of a solution containing 703 g. of "Flexbond D–108" (Colton Chemical Co. brand of polyvinyl stearate) in 2000 cc. of methylene chloride. The resulting slurry was spray dried and the product assayed 94.2% MSB. Upon compounding into a feed and pelletizing, followed by aging for 7 days, the pellets showed a loss of vitamin K potency of only 7.2%.

*Example IX*

Five parts of MSB and one part of monocalcium phosphate, a stabilizer for MSB, were dissolved and suspended in an aqueous phase containing 3% methyl cellulose. This suspension was then spray dried to produce a particle in which MSB and monocalcium phosphate were bound together by the methyl cellulose. This material can be used as is in feed, but better results are obtained by proceeding further, as follows: The dried material was then slurried in a mixture containing 400 parts isopropyl alcohol, 400 parts of "Hydrofol Glyceride T–57" (Archer-Daniels-Midland Co. brand of hydrogenated tallow containing about 70% C18), 40 parts of soybean flour, 8 parts of a wetting agent, 5360 parts of methylene chloride as a solvent for the hydrogenated tallow. The resulting slurry was then spray dried to produce an MSB particle having an inner core of MSB and monocalcium phosphate and a fatty outer coating or film of hydrogenated tallow in which there were dispersed particles of soybean flour and the surface active agent. As the product is ingested, the soybean meal will very rapidly be digested, leaving pores in the particle so that the digestive juices will quickly break up the remaining particle and render the MSB readily available to the animal.

The resulting spray dried complex product contained 84½% MSB. Upon compounding into a feed and pelletizing and after the passage of 7 days the vitamin K activity of the pellets was reduced by only about 10.4%.

| Example | Coating Material | Percent MSB in Coated Dry Product | Feed Assay 7 Days After Pelleting | |
|---|---|---|---|---|
| | | | Mash (M) Pellets (P) (g.M/Ton) | Percent Loss of MSB Vitamin K Potency |
| I | None | | M 63.0 / P 36.6 | 41.8 |
| II | Methyl Cellulose | 65 | M 25.9 / P 20.4 | 21.2 |
| III | Glyceryl Monostearate | 30.9 | M 36.8 / P 29.6 | 19.6 |
| IV | do | 92.2 | M 67.2 / P 50.7 | 24.5 |
| V | Ethyl Cellulose | 82.5 | M 66.5 / P 61.4 | 7.7 |
| VI | Edible Shellac | 87.5 | M 65.2 / P 60.8 | 6.7 |
| VII | Cellulose Acetate Phthalate | 97.5 | M 67.8 / P 56.2 | 17.2 |
| VIII | Polyvinyl Stearate | 94.2 | M 62.2 / P 57.8 | 7.2 |
| IX | Methyl Cellulose and Hydrogenated Tallow | 84.5 | M 61.6 / P 55.2 | 10.4 |

MSB was readily completely extracted with water from the coated material of each of the above examples. This clearly indicates the ready availability to the animal of the MSB of the product.

By varying the proportion of MBA and coating material in the above examples, it is of course possible to control the thickness of the coating film.

From the above examples and table it can be seen that ethyl cellulose and edible shellac are particularly good coating materials as is also polyvinyl stearate. The coating or film material of each of the examples resulted in a pelletized product which was very much more stable as respects vitamin K activity than a pellet which contained an uncoated water soluble menadione bisulfite adduct. It is indeed surprising that such a small quantity of coating material, compared to the weight of MSB in the spray dried or chill cooled product produces such a marked improvement in the stability of the MBA. In order to accomplish this improvement the coating or film surrounding the MSB particles should be substantially continuous and must be of a character capable of protecting MSB from steam, water vapor or deleterious agents during the very drastic temperature and humidity conditions encountered in pelletizing.

What is claimed is:

1. An animal feed premix comprising a carrier material and particles of a water soluble menadione bisulfite adduct in amounts of at least 4 grams per pound of said premix, each of said particles being substantially completely coated with a non-toxic protective film which is substantially moisture impermeable, said film having dispersed therethrough and on its exterior surface, particles of a digestible material distinct from the material of said nontoxic protective film, said premix being adapted for dilution with normal feed ingredients in the formation of a balanced animal feed.

2. An animal feed premix as set forth in claim 1 wherein the digestible material is the same as the carrier.

3. An animal feed premix as set forth in claim 1 wherein the digestible material is a nutritive material.

4. A pelletized animal feed formed under elevated temperature and pressure containing particles of a water soluble menadione bisulfite adduct and of an acid stabilizer for said menadione bisulfite adduct which are substantially completely coated with a non-toxic protective film which is substantially moisture impermeable, said pelletized feed being characterized by a vitamin K activity 7 days after pelleting equal to at least about 75% of the activity of unpelletized feed after the same period.

5. A pelletized animal feed as set forth in claim 4 wherein the acidic stabilizer in monocalcium phosphate.

6. An animal feed premix as set forth in claim 1 wherein the digestible material is calcite flour.

7. An animal feed premix as set forth in claim 1 wherein the digestible material is soybean meal.

References Cited by the Examiner

UNITED STATES PATENTS

| 2,410,417 | 11/46 | Andersen | 99—11 XR |
| 2,827,377 | 3/58 | Frost | 99—2 |
| 2,855,340 | 10/58 | Kent | 99—4 |
| 2,949,400 | 8/60 | Sieger et al. | 99—2 |

A. LOUIS MONACELL, *Primary Examiner.*

ABRAHAM WINKELSTEIN, BEATRICE H. STRIZAK, *Examiners.*